United States Patent [19]
Lee

[11] Patent Number: 5,940,473
[45] Date of Patent: Aug. 17, 1999

[54] TESTING APPARATUS FOR TESTING SIGNALING OF A SWITCHING SYSTEM

[75] Inventor: Dong-Ju Lee, Kyongsangbuk-do, Rep. of Korea

[73] Assignee: SamSung Electronics Co., Ltd., Kyungki-do, Rep. of Korea

[21] Appl. No.: 09/045,589

[22] Filed: Mar. 20, 1998

[30] Foreign Application Priority Data

Mar. 20, 1997 [KR] Rep. of Korea .................. 97-9467

[51] Int. Cl.⁶ .................. H04M 1/24; H04M 3/08; H04M 3/22
[52] U.S. Cl. .................. 379/1; 379/10; 379/12; 379/22; 379/29
[58] Field of Search .................. 379/1, 2, 6, 9, 379/10, 12, 18, 22, 23, 24, 25, 26, 27, 29; 375/213, 224–228, 241; 370/242, 244, 247, 250, 251

[56] References Cited

U.S. PATENT DOCUMENTS

| | | |
|---|---|---|
| 4,247,742 | 1/1981 | Thelen . |
| 4,551,585 | 11/1985 | Daniels et al. . |
| 4,794,632 | 12/1988 | Burton et al. . |
| 4,803,683 | 2/1989 | Mori et al. .................. 371/19 |
| 5,111,497 | 5/1992 | Bliven et al. . |
| 5,384,822 | 1/1995 | Brown et al. .................. 379/10 |
| 5,406,269 | 4/1995 | Baran .................. 379/40 |
| 5,438,614 | 8/1995 | Rozman et al. .................. 379/98 |
| 5,621,782 | 4/1997 | Walance et al. . |
| 5,633,909 | 5/1997 | Fitch .................. 379/15 |
| 5,652,782 | 7/1997 | Hughes-Hartogs .................. 379/27 |
| 5,819,046 | 10/1998 | Johnson .................. 379/201 |
| 5,822,397 | 10/1998 | Newman .................. 379/6 |
| 5,825,849 | 10/1998 | Garland et al. .................. 379/27 |
| 5,835,566 | 11/1998 | Cowgill .................. 379/1 |
| 5,845,823 | 12/1998 | Badger et al. .................. 379/9 |
| 5,867,558 | 2/1999 | Swanson .................. 379/34 |
| 5,875,229 | 2/1999 | Eyuboglu et al. .................. 379/1 |

*Primary Examiner*—Curtis A. Kuntz
*Assistant Examiner*—Rexford Barnie
*Attorney, Agent, or Firm*—Robert E. Bushnell, Esq.

[57] ABSTRACT

A signaling test apparatus for testing a trunk register transmitting/receiving signaling, a subscriber service signal tone, a subscriber DTMF transmitting/receiving signaling, and a CCT transmitting/receiving signaling in a switching system. The signaling test apparatus includes a computer interface for communicating with a computer, a PCM interface for communicating with the switching system, a microprocessor for receiving a test command transmitted from the computer through the computer interface and generating a control signal to perform a corresponding test mode, a test signal storage memory for supplying a plurality of test signals having a predetermined frequency to the switching system through the PCM interface under the control of the microprocessor, and a digital signal processor for analyzing the test signal which is fed back from the switching system and received through the PCM interface under the control of the microprocessor.

12 Claims, 4 Drawing Sheets

TESTING APPARATUS FOR TESTING SIGNALING OF A SWITCHING SYSTEM

CLAIM FOR PRIORITY

This application makes reference to, incorporates the same herein, and claims all benefits accruing under 35 U.S.C. §119 from an application for APPARATUS FOR TESTING SIGNALING OF SWITCHING SYSTEM earlier filed in the Korean Industrial Property Office on the 20$^{th}$ of March 1997, and there duly assigned Serial No. 9467/1997, a copy of which application is annexed hereto.

BACKGROUND OF THE INVENTION

1. Technical Field

The present invention relates to a switching system, and more particularly, to a signaling test apparatus for testing a trunk register transmitting/receiving signaling, a subscriber service signal tone, a subscriber dual tone multi-frequency (DTMF) transmitting/receiving signaling, and a continuity check test (CCT) transmitting/receiving signaling in a switching system.

2. Related Art

Modern communication switching systems require that the communication lines and trunks connecting a central office system to subscriber stations and other offices be maintained at a high performance level. Therefore, it is necessary to provide means to accurately test transmission characteristics of the communication lines and trunks. Testing apparatus must be provided to accurately and conveniently measure signal transmission of the switching system. Examples of conventional testing apparatus are disclosed in U.S. Pat. No. 4,247,742 for Trunk Test Circuit issued to Thelen, U.S. Pat. No. 4,551,585 for Arrangement For Facilitating External Loop Analysis Testing For A Digital Switching System issued to Daniels et al., U.S. Pat. No. 4,794,632 for Telephone Trunk Line Testing Circuitry issued to Burton et al., and U.S. Pat. No. 5,111,497 for Alarm And Test System For A Digital Added Main Line issued to Bliven et al.

Contemporary testing apparatus generally measures only the frequency, level and cadence of a pulse code modulation (PCM) signal received at a PCM highway by means of a signal spectrum analysis equipment. Typically, the testing apparatus is connected to the highway during a test and measures the frequency, level and cadence of the PCM signal by selecting the channel only by the changeover of a manual switch without controlling a processor. Therefore, a trunk register signaling transmitting/receiving function, a dual tone multi-frequency (DTMF) transmitting/receiving function and a continuity check tone (CCT) signaling transmitting/receiving function cannot be accomplished. Moreover, I have noted that each signaling test item in the switching system requires an installation of a separate equipment, and as a result, it is difficult to secure expensive equipments for the test.

SUMMARY OF THE INVENTION

Accordingly, it is therefore an object of the present invention to provide a testing apparatus for testing signaling of a switching system.

It is also an object to provide a testing apparatus of a switching system for performing a trunk register signaling transmitting/receiving function, a dual tone multi-frequency (DTMF) transmitting/receiving function and a continuity check tone (CCT) signaling transmitting/receiving function by using a one-chip microprocessor and a digital signal processor.

These and other objects of the present invention can be achieved by a testing apparatus for testing signaling of a switching system which includes a computer interface for communicating with a computer; a pulse code modulation (PCM) interface for communicating with the switching system; a microprocessor for receiving a test command transmitted from the computer through the computer interface and generating a control signal to perform a corresponding test mode; a test signal storage unit for supplying a plurality of test signals having a predetermined frequency to the switching system through the pulse code modulation (PCM) interface under the control of the microprocessor; and a digital signal processor for analyzing the test signal which is fed back from the switching system and received through the pulse code modulation (PCM) interface under the control of the microprocessor.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
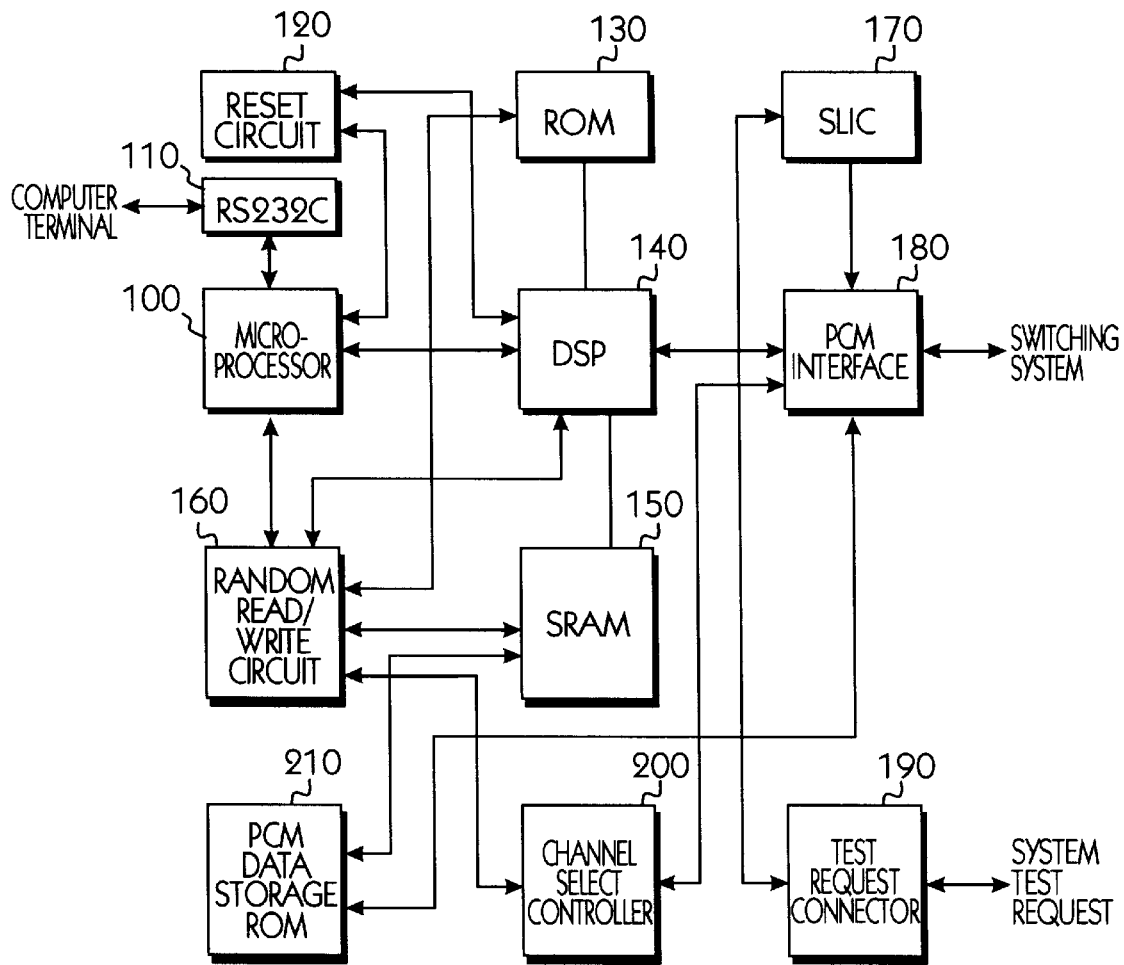
FIG. 1 is a block diagram of a testing apparatus of a switching system constructed according to the principles of the present invention.

Referring now to the drawings and particularly to FIG. 1, which illustrates a testing apparatus for testing signaling of a switching system according to the principles of the present invention. As shown in FIG. 1, the testing apparatus includes a one-chip microprocessor 100 of "I8752BH" manufactured by Intel Co., a computer interface 110 of RS232C, a reset circuit 120, a read-only-memory (ROM) 130, a digital signal processor (DSP) 140, a static random-access-memory (SRAM) 150, a random read/write circuit 160, a subscriber line interface circuit (SLIC) 170, a pulse code modulation (PCM) interface 180, a test request connector 190, a channel select controller 200, and a PCM data storage ROM 210.

The SLIC 170 is an interface unit for interfacing between a tip and ring terminals of an ordinary telephone system and a digital system. The test request connector 190 is an interface unit for interfacing with signaling equipments such as a spectrum analysis multi-frequency generator used for testing procedure. The channel select controller 200 is a unit for controlling the PCM interface 180 to be selectively connected to a desired channel. The reset circuit 120 operates to set a power on reset or a manual reset of the microprocessor 100 and the DSP 140.

The one-chip microprocessor 100 is interfaced with a computer terminal through the RS-232C 110 by using data transmission and reception ports. The microprocessor 100 controls the frequency by using an internal timer function, and communicates with the DSP 140 to provide signaling data such as frequency level data and intermittent data. The DSP 140 has a 24-bit arithmetic logic unit (ALU) used to perform multiplying and dividing operation at high speed. A numerical calculation of the DSP 140 is faster than a general processor by several tens of times; that is, the DSP 140 has an instruction execution speed of 50ns and can perform frequency generation, frequency addition and level handling faster than most general processors. In addition, the DSP 140 can generate a desired frequency and level, and is therefore extremely useful in a signaling test. The DSP 140 processes the R2MFC (R2 multi-frequency) signal, the DTMF signal and the CCT signal in a DSP mode by using a receiving frequency detection algorithm. The computer interface 110 uses a MAX 232 chip to communicate with the computer terminal and the microprocessor 100 in order to transmit and receive various commands and data. The random read/write circuit 160 controls a mode of the DSP 140 by using control signals of the microprocessor 100 and the DSP 140, and implements a ROM read control function, a RAM read/write control function, etc. The high-speed ROM 130 uses a firmware program of a DSP assembly language which can generate transmitting and receiving frequencies of the R2MFC, DTMF and CCT signals. Since the DSP 140 processes the signals at high speed, the high-speed ROM 130 has a read cycle time of 35ns or more.

In order to maintain compatibility with another system, the PCM data storage ROM 210 has the capacity of 128 KBytes to use A-law and Mu-law 8-bit PCM data in the unit of 32 KBytes. The PCM data of 400 bytes stored in the PCM data storage ROM 210 is composed of 15 kinds of automatic number identification (ANI) multi-frequencies, 4 kinds of single frequencies, 16 kinds of DTMF digits, 2 kinds of CCT digits, test data, and null data.

If a test command of a predetermined item is provided through the computer interface 110 for communicating between the computer terminal and the microprocessor 100, the microprocessor 100 receives the test command and transmits a corresponding control signal to an internal unit. In this situation, the microprocessor 100 supplies an interrupt to the DSP processor 140 and supplies an address of a test signal of a corresponding item through the random read/write circuit 160 and SRAM 150 to the PCM data ROM 210 in which a plurality of test signals is stored. The PCM data storage ROM 210 receives the address and supplies the test signal of the corresponding item to a switching system of a called party through the PCM interface 180. The test signal of the corresponding item fed back from the switching system of the called party is transmitted to the DSP 140 through the PCM interface 180. The DSP 140 is operated by a program stored in the ROM 130 and supplies a result of the test signal of the corresponding item to the computer terminal through the microprocessor 100 and the computer interface 110.

Figure 2A:
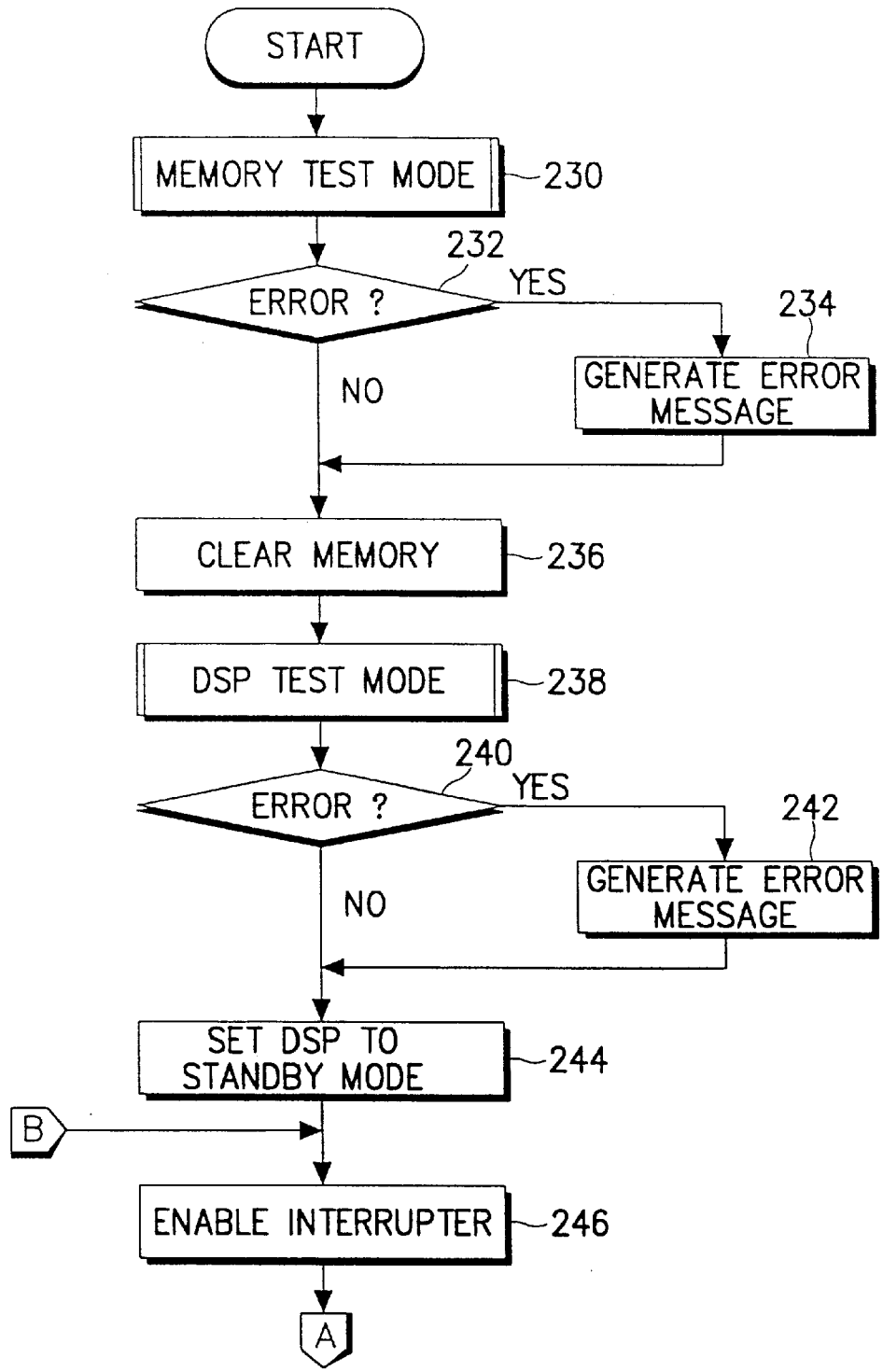
FIGS. 2A and 2B are flow charts for testing signaling of a switching system, executed by a microprocessor according to a preferred embodiment of the present invention.
Figure 2B:
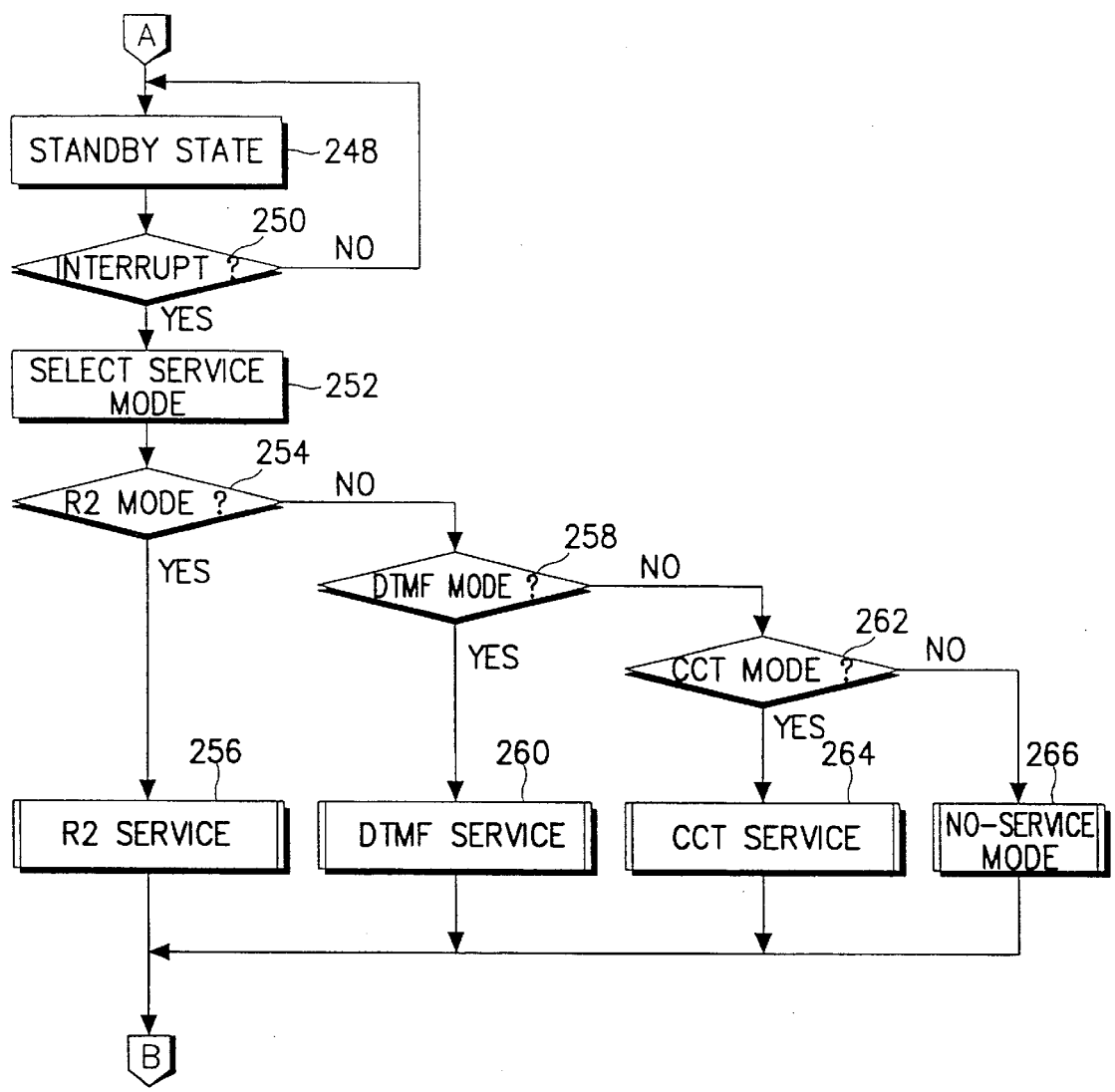

Turning now to FIGS. 2A and 2B which are flow charts for testing signaling of the switching system, executed by the microprocessor 100. At step 230, the microprocessor 100 determines if an error is generated from a testing memory by the microprocessor 100 under a memory test mode. When the microprocessor 100 is in a memory test mode using a test program embedded in an on-chip ROM equipped inside the microprocessor 100, the microprocessor 100 determines whether an error is generated from the testing memory under the memory test mode at step 232. If an error is generated from the testing memory under the memory test mode, the microprocessor 100 generates an error message at step 234. If there is no error, the memory is cleared at step 236.

At steps 238 and 240, the microprocessor 100 determines if an error is generated from the DSP 140 under a DSP test mode. If an error is generated, the microprocessor 100 generates an error message is at step 242. If there is no error, the microprocessor 100 sets the DSP 140 in a standby mode at step 244. At step 246, an interrupter internal of microprocessor 100 for generating an interrupt to DSP 140 with an interruption period of 8 kHz in response to receipt of the test command of a predetermined item is enabled. At steps 248 and 250, the microprocessor 100 checks whether an interrupt is generated under a standby state. If an interrupt is generated, the microprocessor 100 receives the test command of the predetermined item transmitted from the computer terminal and selects a service mode at step 252. The service mode is classified into a R2 signal test service mode, a DTMF signal test service mode, a CCT signal test service mode, and a no-service mode. For example, if the R2 signal test service mode is selected at step 254, the microprocessor 100 provides the R2 signal test service at step 256. Likewise, if the DTMF signal test service mode is selected at step 258, the microprocessor 100 provides the DTMF signal test service at step 260. If the CCT signal test service mode is selected at step 262, the microprocessor 100 provides the CCT signal test service mode at step 264. If no service mode is selected at step 266, no service mode is provided. After the operation of a corresponding service mode is completed, the microprocessor 100 returns to step 246 to enable operation of the interrupter in order to select different test service mode available. Each test function is set by Man Machine Communication (MC) to a designated test mode respectively and then a Sender function of signaling and a Receiver function of signaling are performed, thereby resulting in an output through RS232C interface 110 under the control of the personal computer PC. The subscriber service signal tone is analyzed through test request connector 190, and is tested by testing apparatus for each type of tones, frequencies, level and cadence of surroundings.

Figure 3:
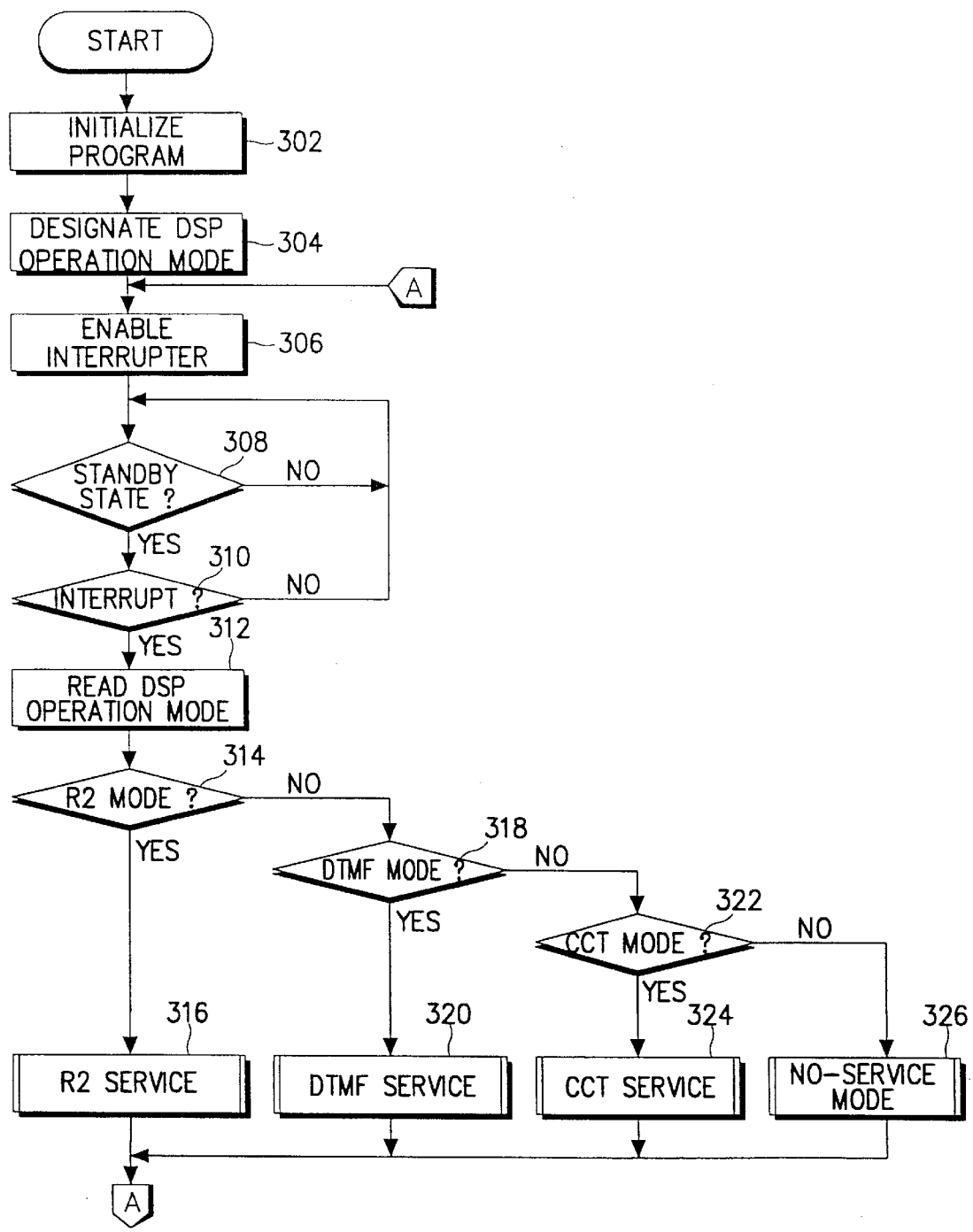
FIG. 3 is a flow chart for testing signaling of a switching system, executed by a digital signal processor according to a preferred embodiment of the present invention.

FIG. 3 is a flow chart for testing signaling of the switching system, executed by the DSP 140. At step 302, the DSP 140 initializes an internal program on the basis of a system initialization command from the microprocessor 100. At step 304, the DSP 140 designates a DSP operation mode, that is, a signaling test mode. At step 306, the DSP 140 enables the interrupter to generate an interrupt when the test command is generated from the microprocessor 100. At steps 308 and 310, the DSP 140 checks whether an interrupt is generated under a standby state. If an interrupt is generated, the DSP 140 receives the test command transmitted from the microprocessor 100 and reads the DSP operation mode at step 312. If the operation of a corresponding service mode is completed, step 306 at which the interrupter is enabled is carried out. The service mode is classified into the R2 signal test service mode, the DTMF signal test service mode, the CCT signal test service mode, and the no-service mode.

As described above, the trunk register signaling transmitting/receiving function, DTMF transmitting/receiving function and CCT signaling transmitting/receiving function of a switching system are accomplished by using the one-chip microprocessor and the DSP. Therefore, there is no need for expensive test equipments, and the cost can therefore be reduced. Even if a new test item is added, the new test item can simply be solved only by changing a program.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A testing apparatus for testing signaling of a switching system, comprising:

a computer interface for communicating with a computer;

a pulse code modulation (PCM) interface for communicating with said switching system;

a microprocessor for receiving a test command transmitted from said computer through said computer interface and generating a control signal to perform a corresponding test mode;

a test signal storage unit for supplying a plurality of test signals having a predetermined frequency to said switching system through said pulse code modulation (PCM) interface under the control of said microprocessor; and a digital signal processor for analyzing the test signal which is fed back from said switching system and received through said pulse code modulation (PCM) interface under the control of said microprocessor.

2. The testing apparatus of claim 1, further comprising a read/write circuit for generating a corresponding system clock under the control of said microprocessor.

3. The testing apparatus of claim 1, further comprised of said computer interface corresponding to a RS232C interface.

4. The testing apparatus of claim 1, further comprising:

a subscriber line interface connected to said digital signal processor, for interfacing between tip and ring terminals of a telephone system;

a test request connector connected to said digital signal processor, for interfacing with a signaling equipment used for testing procedure;

a channel select controller for controlling said pulse code modulation interface to be selectively connected to a desired channel; and a reset circuit for resetting operation of said microprocessor and said digital signal processor.

5. The testing apparatus of claim 1, further comprised of said microprocessor testing signaling of said switching system by:

determining whether an error is generated from a testing memory during a memory test mode;

when said error is generated from said testing memory during said memory test mode, generating an error message indicating said error;

when said error is not generated from said testing memory during said memory test mode, clearing said testing memory;

determining whether an error is generated from said digital signal processor during a digital signal processor test mode;

when said error is generated from said digital signal processor during said digital signal processor test mode, generating an error message indicating said error;

when said error is not generated from said digital signal processor during said digital signal processor test mode, setting said digital signal processor to a standby mode;

determining whether an interrupt is generated during said standby mode in response to receipt of said test command of a predetermined item; and when said interrupt is generated during said standby mode, selecting a service mode from a plurality of test service modes available for testing the signaling for different types of signal tones, frequencies, levels and cadences.

6. The testing apparatus of claim 1, further comprised of said digital signal processor testing signaling of said switching system by:

enabling an interrupter to generate an interrupt when said test command is generated from said microprocessor during a signaling test mode;

determining whether said interrupt is generated from said interrupter during a standby mode; and when said interrupt is generated from said interrupter during said standby mode, reading said signaling test mode, and selecting a service mode from a plurality of test service modes available for testing the signaling for different types of signal tones, frequencies, levels and cadences.

7. The testing apparatus of claim 1, further comprised of said digital signal processor comprising a 24-bit arithmetic logic unit for performing numerical calculations at high speed.

8. A testing apparatus for testing signaling of a switching system, comprising:

a computer interface for interfacing with a computer terminal;

a pulse code modulation interface for interfacing with said switching system;

a microprocessor for receiving a test command transmitted from said computer terminal through said computer interface and generating a corresponding control signal for a corresponding test mode;

a test signal storage unit for providing a plurality of test signals of corresponding items to said switching system through said pulse code modulation interface under the control of said microprocessor; and a digital signal processor for analyzing a test signal of a corresponding item which is fed back from said switching system and received through said pulse code modulation interface under the control of said microprocessor.

9. The testing apparatus of claim 8, further comprised of said microprocessor testing signaling of said switching system by:

determining whether an error is generated from a testing memory during a memory test mode;

when said error is generated from said testing memory during said memory test mode, generating an error message indicating said error;

when said error is not generated from said testing memory during said memory test mode, clearing said testing memory;

determining whether an error is generated from said digital signal processor during a digital signal processor test mode;

when said error is generated from said digital signal processor during said digital signal processor test mode, generating an error message indicating said error;

when said error is not generated from said digital signal processor during said digital signal processor test mode, setting said digital signal processor to a standby mode;

determining whether an interrupt is generated during said standby mode in response to receipt of said test command of a predetermined item; and when said interrupt is generated during said standby mode, selecting a service mode from a plurality of test service modes available for testing the signaling for different types of signal tones, frequencies, levels and cadences.

10. The testing apparatus of claim 8, further comprised of said digital signal processor testing signaling of said switching system by:

enabling an interrupter to generate an interrupt when said test command is generated from said microprocessor during a signaling test mode;

determining whether said interrupt is generated from said interrupter during a standby mode; and when said interrupt is generated from said interrupter during said standby mode, reading said signaling test mode, and selecting a service mode from a plurality of test service modes available for testing the signaling for different types of signal tones, frequencies, levels and cadences.

11. The testing apparatus of claim 8, further comprised of said digital signal processor comprising a 24-bit arithmetic logic unit for performing numerical calculations at high speed.

12. The testing apparatus of claim 10, further comprised of said digital signal processor comprising a 24-bit arithmetic logic unit for performing numerical calculations at high speed.

* * * * *